United States Patent
Huang

(10) Patent No.: US 6,683,460 B2
(45) Date of Patent: Jan. 27, 2004

(54) TEST DEVICE FOR INTERNET AND TELEPHONE LINES

(76) Inventor: Hobbes Huang, Fl. 3, No. 4, Lane 40, Bo Jue St., Hsi Chin City, Taipei Hsien (TW)

( * ) Notice: Subject to any disclaimer, the term of this patent is extended or adjusted under 35 U.S.C. 154(b) by 75 days.

(21) Appl. No.: 10/132,189

(22) Filed: Apr. 26, 2002

(65) Prior Publication Data

US 2003/0201782 A1 Oct. 30, 2003

(51) Int. Cl.[7] ............................................... G01R 31/08
(52) U.S. Cl. ...................... 324/538; 324/508; 324/72.5; 379/21; 439/638; 439/76.1; 439/500
(58) Field of Search ........................... 379/21; 439/638, 439/76.1, 500; 324/72.5, 538, 508, 512, 537, 754, 158.1, 542

(56) References Cited

U.S. PATENT DOCUMENTS

| | | | |
|---|---|---|---|
| 4,533,864 A | * 8/1985 | Austin | 324/508 |
| 5,687,213 A | * 11/1997 | Larkin | 379/21 |
| 6,205,201 B1 | * 3/2001 | Prince | 379/27.01 |

* cited by examiner

*Primary Examiner*—N. Le
*Assistant Examiner*—Vincent Q. Nguyen
(74) *Attorney, Agent, or Firm*—Rosenberg, Klein & Lee

(57) ABSTRACT

A test device for internet and telephone lines is provided. The test device includes: a main test set having a stretched casing in which a first circuit board is installed, wherein an internet plug and an internet receiving socket are soldered on the first circuit board and a connecting portion is located on one end of the main test set, the internet plug being formed on the connecting portion; and a secondary test tool having a stretched casing in which a second circuit board is installed, wherein an internet plug and an internet receiving socket are soldered on the second circuit board and a recessed connecting portion is located on one end of the secondary test tool, the internet receiving socket being formed on the recessed connecting portion.

7 Claims, 4 Drawing Sheets

TEST DEVICE FOR INTERNET AND TELEPHONE LINES

BACKGROUND OF THE INVENTION

1. Field of the Invention

The present invention relates to a handy test device for internet cables and telephone lines. More particularly, the present invention relates to an improved combined test device for internet and telephone lines.

2. Description of the Prior Art

A conventional test kit for internet/ether-net cables generally comprises a main test set and a secondary test tool. When use, the main test set must be applied in conjunction with the secondary test tool. However, as known in the art, the commercial test kit on the market, which as mentioned comprises a main test set and a secondary test tool for testing data transportation quality of these cables, is typically manufactured in the form of a separated structure. In other words, the secondary test tool is not combined with the main test set mechanically. The main drawback of this design is that an inspector or a user usually finds out that one of these two parts of the test kit is missing when he or she needs them to finish cable testing jobs.

First mechanically combined test device for internet cables is disclosed in Taiwan Patent No. 433,466 that is issued to the same applicant of the present invention. In this patent, a secondary test tool is embedded inside of a main test set body. This, however, results in increased wall thickness of the main test set body and hence lowers the convenience when an inspector carries the test device that is large in size.

Consequently, there is a strong need in this field to provide a handy test device for internet and telephone lines, which has an integrated structure and is relatively small in size.

SUMMARY OF THE INVENTION

It is a primary object of the present invention to provide an improved test device for internet and telephone lines which utilizes an internet plug and an internet receiving socket to combine a main test set and a secondary test tool together.

Another objective of this invention is to provide an improved test device for internet and telephone lines which has a clipping mechanism for clipping the test device on a pocket.

Still another objective of this invention is to provide an improved test device for internet and telephone lines which is small in size, and therefore it is more convenient to use and carry. Plus, an inspector can easily read the inspecting status displayed by display light regardless the insertion direction of the main test set.

According to the claimed invention, a test device for internet and telephone lines is provided. The test device comprises: a main test set having a stretched casing in which a first circuit board is installed, wherein an internet plug and an internet receiving socket are soldered on the first circuit board and a protruding connecting portion is located on one end of the main test set, the internet plug being formed on the connecting portion; and a secondary test tool having a stretched casing in which a second circuit board is installed, wherein an internet plug and an internet receiving socket are soldered on the second circuit board and a recessed connecting portion is located on one end of the secondary test tool, the internet receiving socket being formed on the recessed connecting portion.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
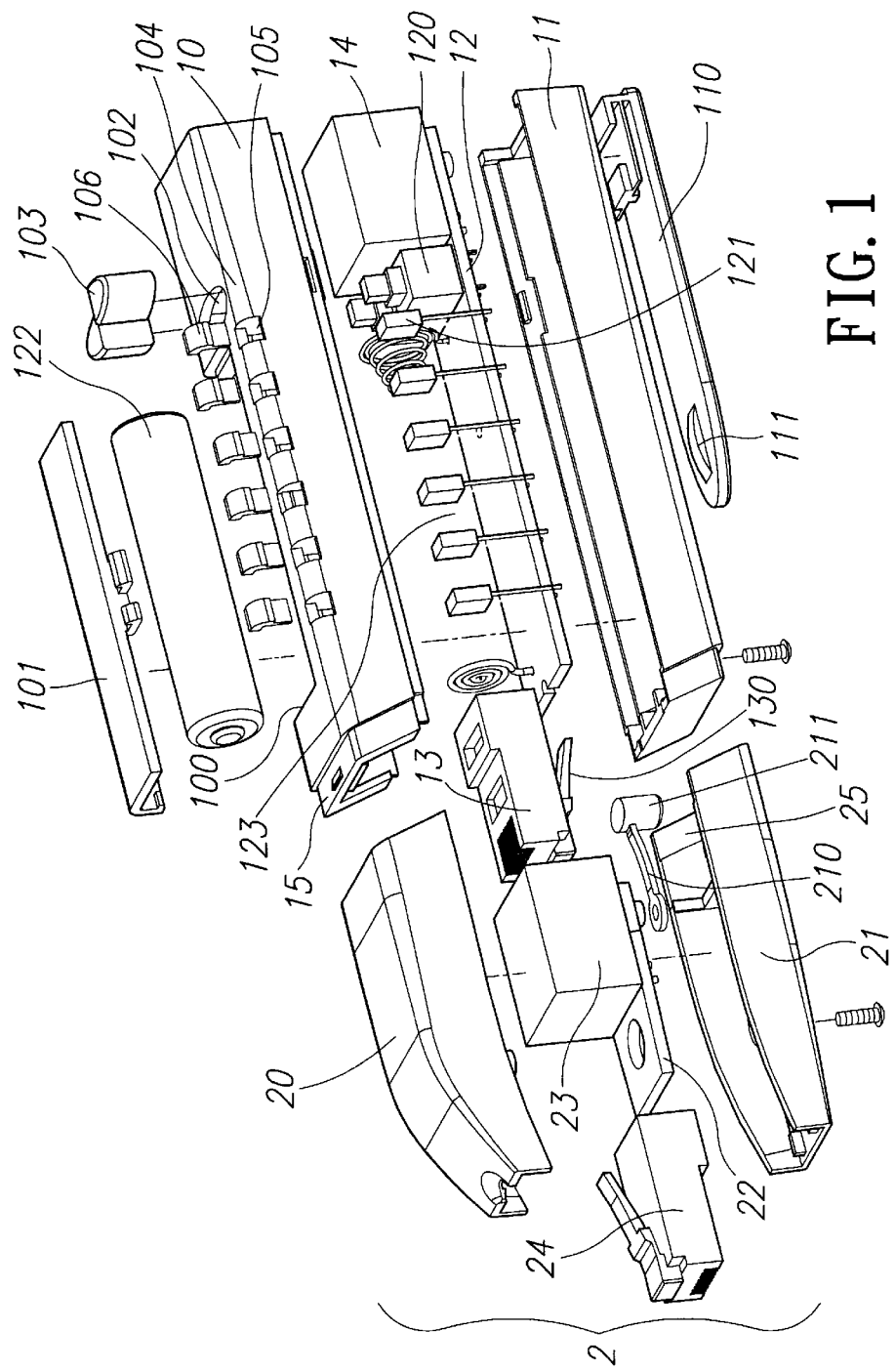
FIG. 1 is an exploded diagram of one preferred embodiment of this invention.
Figure 2:
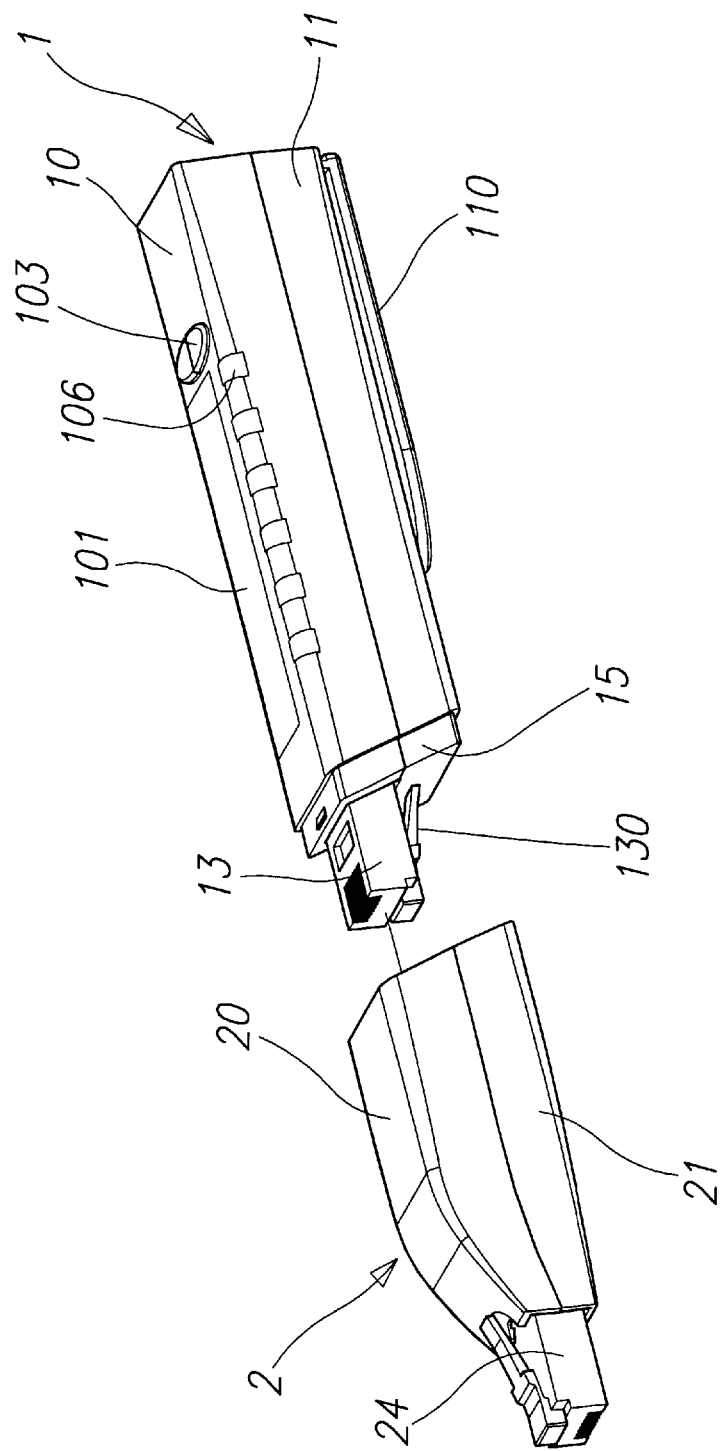
FIG. 2 and FIG. 3 are perspective diagrams of this invention after assembling.
Figure 3:
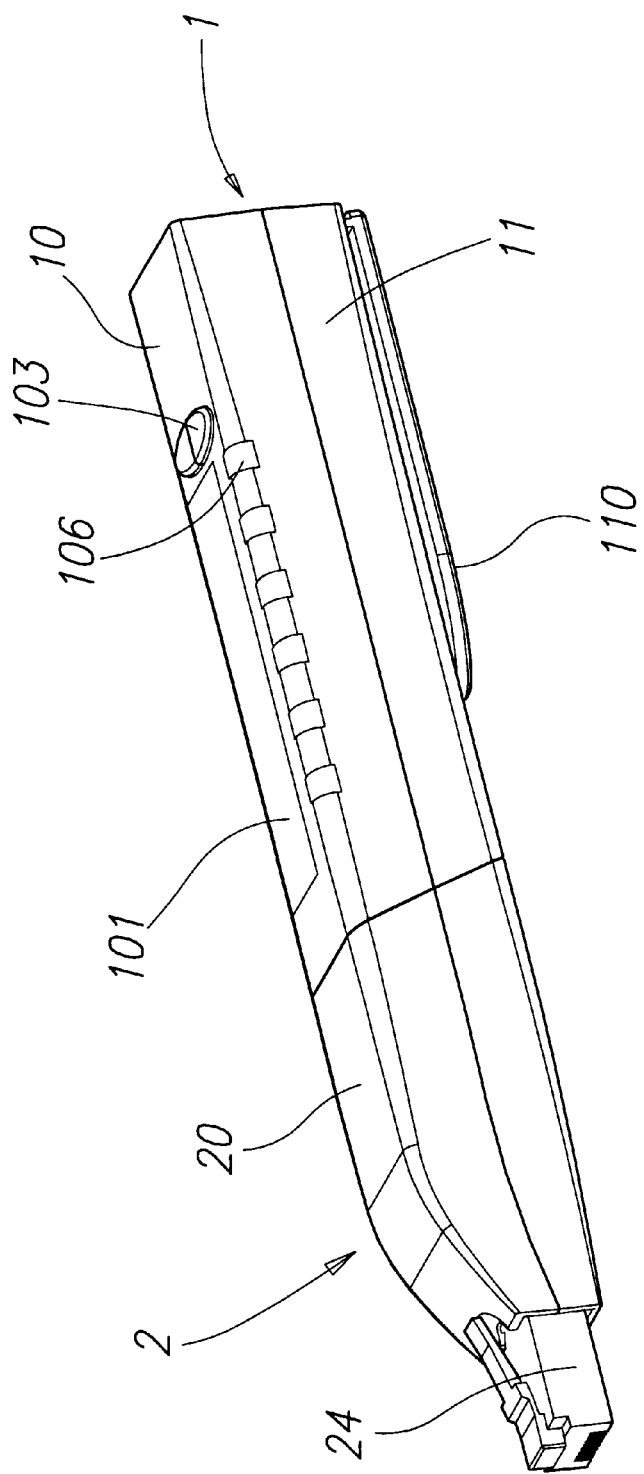

Referring to FIG. 1 to FIG. 3 of the preferred embodiment according to the present invention. FIG. 1 is an exploded diagram of one preferred embodiment of this invention. FIG. 2 and FIG. 3 are perspective diagrams of this invention after assembling. This invention provides an improved test device for internet and telephone lines. As shown in FIG. 1 to FIG. 3, the improved test device comprises a main test set 1 and a secondary test tool 2.

The main test set 1 is a casing consisting of a first top casing 10 and a first bottom casing 11. A first circuit board 12, which has an internet plug 13, an internet receiving socket 14, switch bottoms 120, and display light 121 soldered thereon, is installed in the casing. The internet plug 13 and the internet receiving socket 14 are disposed on opposite sides of the first circuit board 12. A spacing 123 for accommodating a battery 122 is between the internet plug 13 and the internet receiving socket 14.

As illustrated, an opening 100 is formed on the first top casing 10 over the spacing 123 defined on the first circuit board 12. A lid 101 is provided to cover the opening when assembly. An opening 102 corresponding to the switch bottom 120 installed on the first circuit board 12 is provided on the first top casing 10. A button head 103 is installed in the opening 102. By depressing the button head 103, the switch bottom 120 of the first circuit board 12 is turned on/off.

A plurality of lighting holes 105 are arranged along the length of the casing, as illustrated, preferably, on an upper corner side 104 of the first top casing 10. Each of the lighting holes corresponds to a display light 121 on the first circuit board 12. The display light 121 protrudes in each associated lighting hole when assembly. A transparent cover 106 may be disposed on each of the light holes 105. By this configuration, an inspector can easily read the inspecting status displayed by the display light 121 regardless the insertion direction of the main test set 1.

A clip 110 is connected to the first bottom casing 11. The clip 110 has a connecting end that is tightly fixed on a bottom surface of the first bottom casing 11 and a free distal end with a protrusion 111 thereon. An inspector can carry the test device by clipping it on a coat pocket.

The secondary test tool 2 has a casing consisting a second top casing 20 and a second bottom casing 21. A second circuit board 22 is installed in the casing. When use, the second circuit board 22 is combined with the main test set 1. Likewise, a internet plug 24 and a internet receiving socket 23 are installed in the casing on the second circuit board 22.

It is a primary objective of this invention to integrating the secondary test tool 2 with the main test set 1. According to the preferred of this invention. This goal is achieved by inserting the internet plug 13 of the main test set 1 into the internet receiving socket 23 of the secondary test tool. After combining the first top casing 10 and the first bottom casing 11, a connecting portion 15 protrudes in the front end of the main test set 1. The connecting portion 15 has a declining connecting surface as illustrated. The internet plug 13 is installed on the connecting portion 15. A connecting recess portion 25 is provided on the rear portion of the secondary test tool 2. The connecting recess portion 25 has a periphery region having a declining surface associated with the declining surface of the connecting portion 15 of the main test set 1. The internet receiving socket 23 of the secondary test tool 2 is installed on the connecting recess portion 25.

Figure 4:
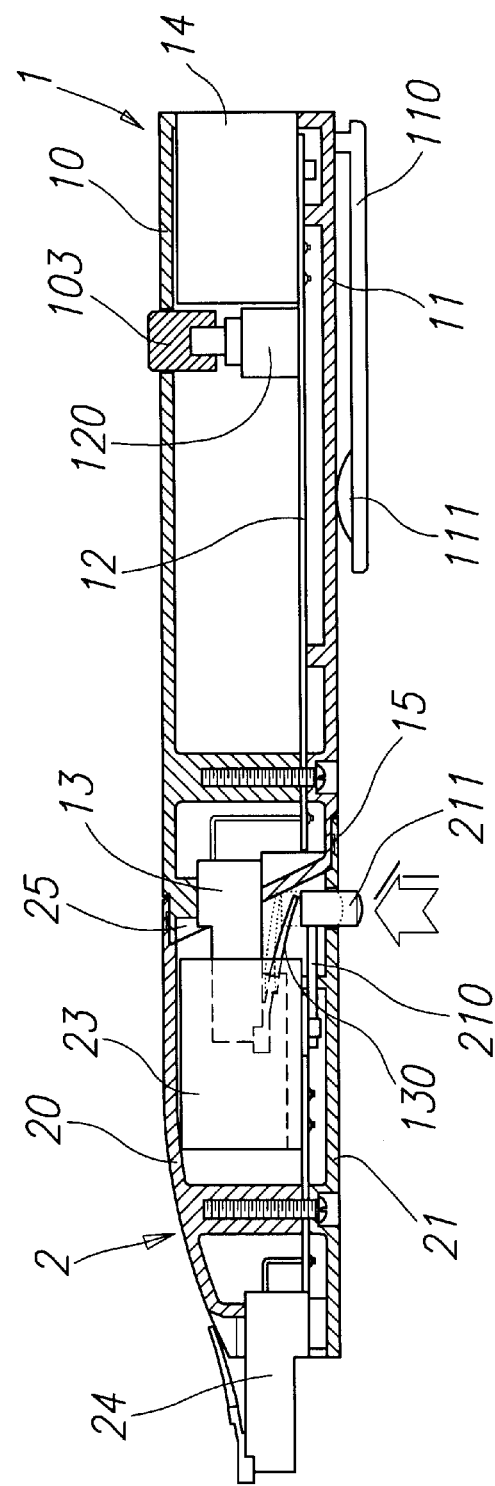
FIG. 4 is a side view illustrating this invention.

As shown in FIG. 3 and FIG. 4, when the test device for internet and telephone lines is not in use, the internet plug 13 of the main test set 1 is inserted into the internet receiving socket 23 of the secondary test tool 2. In this case, the connecting portion 15 of the main test set 1 engages with the connecting recess portion 25 of the secondary test tool 2, thereby combining the main test set 1 with the secondary test tool 2. The combined test device may have a pen shape structure and has a smooth appearance. Further, the declined surfaces of the connecting portion 15 and the connecting recess portion 25 facilitate the connection of these two parts, i.e., the main test set 1 and the secondary test tool 2. When an inspector needs to use the combined test device, he or she depresses a snapping piece 130 located over the internet plug 13 to detach the secondary test tool 2 from the main test set 1.

As shown in FIG. 4 with reference to FIG. 1, a depressing bar 210 may be disposed on the secondary test tool 2. A depressing portion 211 that is provided on one end of the depressing bar 210 protrudes out of the casing of the secondary test tool 2. The other end of the depressing piece 210 is fixed inside the casing of the secondary test tool 2. Such, even when the snapping piece 130 over the internet plug 13 merges inside the casing of the main test set 1, the internet plug 13 may be detached from the internet receiving socket 23 by depressing the depressing portion 211 of the depressing bar 210.

In short, the present provides a handy combined test device that has a pen shape. The combined test device for internet and telephone lines has a main test set and a secondary test tool that is integrated with the main test set. Normally, the secondary test tool is locked on a front end of the main test set. When use, the secondary test tool may be detached from the main test set by simply depressing a depressing piece or a snapping piece. Further, the internet plug 13 increases convenience of testing jobs since a male-to-male converter is not necessary. Moreover, the combined test device according to this invention is small in size and thus easy to carry.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A test device for internet and telephone lines, comprising:

a main test set having a stretched casing in which a first circuit board is installed, wherein an internet plug and an internet receiving socket are soldered on the first circuit board and a connecting portion is located on one end of the main test set, the internet plug being formed on the connecting portion; and a secondary test tool having a stretched casing in which a second circuit board is installed, wherein an internet plug and an internet receiving socket are soldered on the second circuit board and a recessed connecting portion is located on one end of the secondary test tool, the internet receiving socket being formed on the recessed connecting portion.

2. The test device of claim 1 wherein the casing of the main test set consists of a first top casing and a first bottom casing.

3. The test device of claim 2 wherein a plurality of lighting holes are arranged along the length of the casing on an upper corner side of the first top casing and each of the lighting holes corresponds to a display light on the first circuit board, and wherein the display light protrudes in each associated lighting hole when assembly.

4. The test device of claim 2 wherein a clip is connected to the first bottom casing, and the clip has a connecting end that is tightly fixed on a bottom surface of the first bottom casing and a free distal end with a protrusion thereon.

5. The test device of claim 1 wherein both the connecting portion of the main test set and the recessed connecting portion have a declined connecting surface.

6. The test device of claim 1 wherein the casing of the secondary test tool consists of a second top casing and a second bottom casing.

7. The test device of claim 1 wherein a depressing bar may be disposed on the secondary test tool, a depressing portion that is provided on one end of the depressing bar protrudes out of the casing of the secondary test tool, and wherein the other end of the depressing bar is fixed inside the casing of the secondary test tool.

* * * * *